(12) United States Patent
Horn et al.

(10) Patent No.: US 9,475,723 B2
(45) Date of Patent: Oct. 25, 2016

(54) MOLDS FOR SHAPING GLASS AND METHODS FOR MAKING THE SAME

(71) Applicant: CORNING INCORPORATED, Corning, NY (US)

(72) Inventors: Kristen Marie Horn, Mars, PA (US); David Myron Lineman, Painted Post, NY (US); Kevin Thomas Morris, Hammondsport, NY (US); Wenchao Wang, Ithaca, NY (US); Kim E. Womer, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/836,561

(22) Filed: Aug. 26, 2015

(65) Prior Publication Data
US 2015/0360993 A1 Dec. 17, 2015

Related U.S. Application Data

(62) Division of application No. 14/158,262, filed on Jan. 17, 2014, now Pat. No. 9,145,323.

(60) Provisional application No. 61/754,798, filed on Jan. 21, 2013.

(51) Int. Cl.
*C03B 40/00* (2006.01)
*C03B 11/00* (2006.01)
(Continued)

(52) U.S. Cl.
CPC ............... *C03B 40/00* (2013.01); *C03B 11/00* (2013.01); *C03B 23/002* (2013.01);
(Continued)

(58) Field of Classification Search
USPC ...................................... 162/106, 24, 374.11
IPC .................................. C03B 11/08; C23C 8/10
See application file for complete search history.

(56) References Cited

U.S. PATENT DOCUMENTS

| 1,575,122 A | 3/1926 | Madsen |
|---|---|---|
| 2,746,209 A | 5/1956 | Walters |

(Continued)

FOREIGN PATENT DOCUMENTS

| CN | 1733963 | 2/2006 |
|---|---|---|
| CN | 101549946 | 12/2010 |

(Continued)

OTHER PUBLICATIONS

Manns et al.; "Glass in contact with mould materials for container production"; Glastech. Ber. Glass Sci. Technol. 68 (1995) No. 12; pp. 389-399.

(Continued)

*Primary Examiner* — Mark Halpern
(74) *Attorney, Agent, or Firm* — John T. Haran

(57) ABSTRACT

A mold for shaping glass can be made by a method that includes providing a mold body having a shaping surface comprising at least about 90% nickel and modifying the composition of the shaping surface of the mold body by exposing the shaping surface to an oxidizing heat treatment. The oxidizing heat treatment may include a ramping heat treatment, a fixed heat treatment, or both the ramping heat treatment and the fixed heat treatment. The ramping heat treatment may include increasing a heating temperature at a rate from about 20° C./hour to about 500° C./hour to a temperature from about 700° C. to about 1000° C. The fixed heat treatment may include holding the heating temperature from about 700° C. to about 1000° C. for a holding time of at least about 5 minutes.

5 Claims, 3 Drawing Sheets

(51) Int. Cl.

| | | |
|---|---|---|
| *C03B 23/035* | (2006.01) | |
| *C23C 8/10* | (2006.01) | |
| *C03B 40/02* | (2006.01) | |
| *C03B 23/025* | (2006.01) | |
| *C03B 23/03* | (2006.01) | |
| *C03B 23/00* | (2006.01) | |
| *C03B 23/023* | (2006.01) | |

(52) U.S. Cl.
CPC ........ *C03B 23/023* (2013.01); *C03B 23/0252* (2013.01); *C03B 23/0302* (2013.01); *C03B 23/0355* (2013.01); *C03B 23/0357* (2013.01); *C03B 40/02* (2013.01); *C23C 8/10* (2013.01); Y02P 40/57 (2015.11)

(56) References Cited

U.S. PATENT DOCUMENTS

| | | |
|---|---|---|
| 4,188,240 A | 2/1980 | Yoshio |
| 4,405,670 A | 9/1983 | Labib |
| 4,483,700 A | 11/1984 | Forker, Jr. et al. |
| 4,784,338 A | 11/1988 | Saladin |
| 5,037,070 A | 8/1991 | Druschitz |
| 5,342,426 A | 8/1994 | Dumbaugh, Jr. |
| 5,656,104 A | 8/1997 | Imamura et al. |
| 5,674,790 A | 10/1997 | Araujo |
| 5,756,130 A | 5/1998 | Umebayashi et al. |
| 5,876,478 A | 3/1999 | Imamura et al. |
| 5,964,916 A | 10/1999 | Segawa et al. |
| 6,207,247 B1 | 3/2001 | Morita |
| 6,502,423 B1 | 1/2003 | Ostendarp et al. |
| 6,758,064 B1 | 7/2004 | Kariya |
| 7,409,839 B2 | 8/2008 | Boratav et al. |
| 7,666,511 B2 | 2/2010 | Ellison et al. |
| 7,685,840 B2 | 3/2010 | Allaire et al. |
| 7,770,414 B2 | 8/2010 | Cimo et al. |
| 8,158,543 B2 | 4/2012 | Dejneka et al. |
| 8,210,001 B2 | 7/2012 | Allan et al. |
| 8,586,492 B2 | 11/2013 | Barefoot et al. |
| 8,701,443 B2 | 4/2014 | Bailey et al. |
| 8,783,066 B2 | 7/2014 | Bailey et al. |
| 8,802,581 B2 | 8/2014 | Dejneka et al. |
| 8,969,226 B2 | 3/2015 | Dejneka et al. |
| 9,290,413 B2 | 3/2016 | Dejneka et al. |
| 2002/0054976 A1 | 5/2002 | Nakamura et al. |
| 2005/0095404 A1 | 5/2005 | Schillert et al. |
| 2009/0236016 A1 | 9/2009 | Masuda et al. |
| 2010/0229600 A1 | 9/2010 | Fukumoto et al. |
| 2012/0047953 A1 | 3/2012 | Feng et al. |
| 2012/0135226 A1 | 5/2012 | Bookbinder et al. |
| 2013/0323444 A1 | 12/2013 | Ehemann et al. |

FOREIGN PATENT DOCUMENTS

| | | |
|---|---|---|
| CN | 102248358 | 11/2011 |
| CN | 102501047 | 6/2012 |
| CN | 102560265 | 7/2012 |
| CN | 102626847 | 8/2012 |
| CN | 102730943 | 10/2012 |
| DE | 132711 | 7/1902 |
| EP | 1285974 | 2/2003 |
| EP | 2540682 | 1/2013 |
| JP | 63501654 | 6/1988 |
| JP | 2006289519 | 10/2006 |
| JP | 2010111055 | 5/2010 |
| KR | 1053701 | 8/2011 |
| KR | 1073717 | 10/2011 |
| WO | 8809990 | 12/1988 |
| WO | 2010002446 | 1/2010 |

OTHER PUBLICATIONS

Patent Cooperation Treaty International Notification of Transmittal of the International Search Report and The Written Opinion of the International Searching Authority, international application No. PCT/US2014/012294: mailing date Sep. 25, 2014, 12 pages.
International Search Report and Written Opinion of the International Searching Authority; PCT/US2014/012288; Mailed Apr. 17, 2014; 11 Pages.
JP2015553885 Office Action Dated Jan. 5, 2016; 4 Pages.
KR20157022640 Office Action Dated Dec. 14, 2015; 3 Pages.

MOLDS FOR SHAPING GLASS AND METHODS FOR MAKING THE SAME

CROSS REFERENCE TO RELATED APPLICATIONS

This application is a divisional of U.S. application Ser. No. 14/158,262, filed on Jan. 17, 2014, which claims the benefit of priority under 35 U.S.C. §119 to Provisional Application Ser. No. 61/754,798, filed on Jan. 21, 2013, and is related to U.S. application Ser. No. 14/158,242, filed on Jan. 17, 2014 and also claiming priority under 35 U.S.C. §119 to Provisional Application Ser. No. 61/754,798, filed on Jan. 21, 2013, the content of each is relied upon and incorporated herein by reference in its entirety.

BACKGROUND

1. Field

The present specification generally relates to molds and, more specifically, to molds for shaping glass.

2. Technical Background

The current demand in modern electronics devices for thin, three dimensional glass substrates that have very high levels of surface quality has produced a need to find new materials and processes that are commercially capable of providing defect-free shaped glass substrates. Shaped glass forming generally refers to high temperature processes that involve heating the glass to be formed to a temperature at which it can be manipulated, and then conforming it to a mold to get the designed shape. Classic methods of shaping glass substrates include television tube forming, where a softened glass gob is pressed between male & female molds, and bottle forming, where glass is blown in a pair of hollowed molds.

In shaping operations, mold material selection is often the key to success. In order to optimize the shape and surface quality of the formed glass article, the mold material must: 1) have excellent oxidation and corrosion resistances at the process temperatures; 2) have minimal reaction with the glass (no sticking); and 3) be strong enough at the process temperature in order to resist the deformation and distortion from the forming force.

In reality, it can be difficult to select one material to meet all the above requirements. One solution has been to apply coatings on the mold surface to get the combined merits of the various materials to achieve forming success. Coated molds are the most commonly used in the glass forming industries today. Uncoated molds (or bare molds) are rare, and are limited to lower-end glass products such as bottles and certain glassware that don't require high surface quality. If bare molds are used, there is generally some level of lubrication applied to help with the forming process and to retain surface quality. These lubricants are difficult to consistently apply and require a secondary cleaning step to remove. For higher-end products, especially for optical-quality products such as press-formed camera lenses, coatings have been deemed as essential.

Although coatings help to meet the challenges in glass forming process, they create new problems. For example, coatings can add significant costs and new variables to manage the processes. More importantly, coatings often deteriorate during operation and lose functionality, limiting the lifetime of the mold and necessitating frequent re-coating. Therefore, there is an unmet need in the area of high-end, high quality glass substrates to obtain better mold materials that are commercially capable of providing defect-free, shaped glass substrates.

SUMMARY

The embodiments described herein relate to molds for shaping glass and methods for making the same. According to one embodiment, a mold for shaping glass can be made by a method that may comprise providing a mold body having a shaping surface comprising at least about 90% nickel and modifying the composition of the shaping surface of the mold body by exposing the shaping surface to an oxidizing heat treatment. The oxidizing heat treatment may comprise a ramping heat treatment, a fixed heat treatment, or both the ramping heat treatment and the fixed heat treatment. The ramping heat treatment may comprise increasing a heating temperature at a rate from about 20° C./hour to about 500° C./hour to a temperature from about 700° C. to about 1000° C. The fixed heat treatment may comprise holding the heating temperature from about 700° C. to about 1000° C. for a holding time of at least about 5 minutes. The nickel oxide layer may have an average thickness from about 500 nm to about 20 micron.

In another embodiment, a mold for shaping glass may comprise a mold body having a shaping surface and a nickel oxide layer on the shaping surface. At least a portion of the mold body near the shaping surface may comprise at least about 90% nickel. The nickel oxide layer may have an average thickness from about 500 nm to about 20 micron and the nickel oxide layer may have an average surface roughness ($R_a$) of less than or equal to about 1 micron on the shaping surface of the mold.

In yet another embodiment, a glass article may be made by a method comprising supplying a mold for shaping glass and forming a glass article by contacting glass with the mold at a temperature sufficient to allow for shaping of the glass. The mold may comprise a mold body having a shaping surface and a nickel oxide layer on the shaping surface. At least a portion of the mold body near the shaping surface may comprise at least about 90% nickel. The nickel oxide layer may have an average thickness from about 500 nm to about 20 micron, and the nickel oxide layer may have an average surface roughness ($R_a$) of less than or equal to about 1 micron on the shaping surface of the mold.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
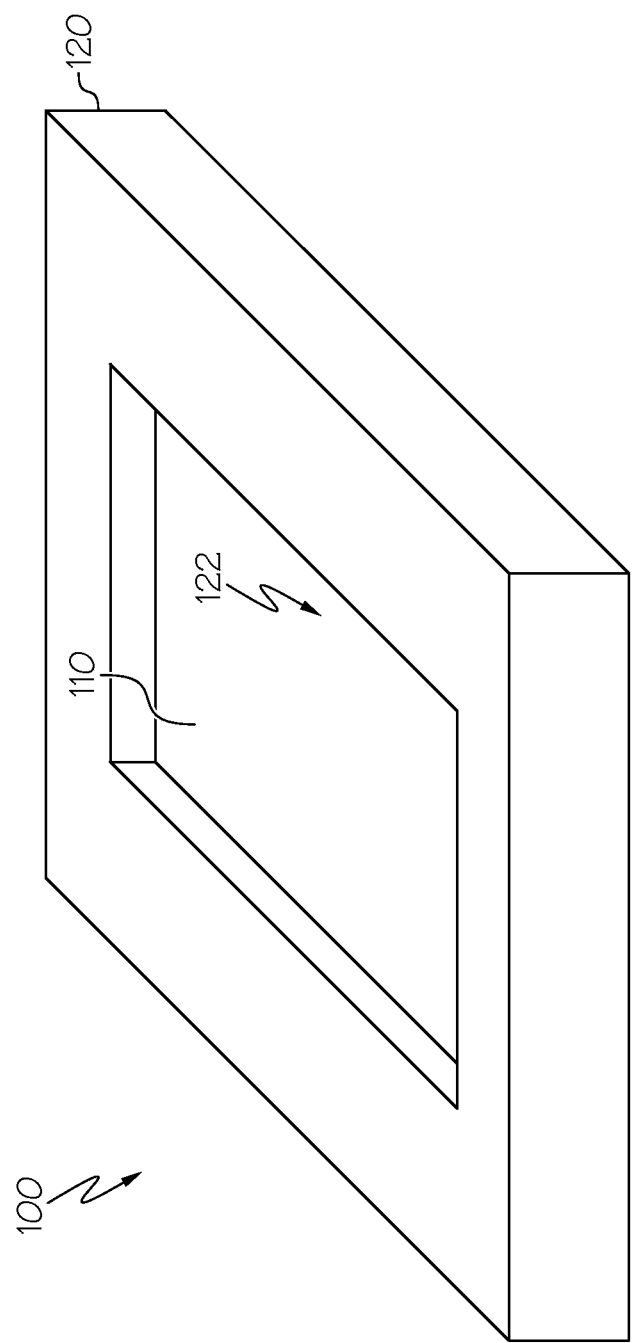
FIG. 1 schematically depicts the structure of a mold for shaping glass, according to one or more embodiments shown and described herein.

Reference will now be made in detail to various embodiments of molds for shaping glass and methods for making molds for shaping glass, examples of which are illustrated in the accompanying drawings. Whenever possible, the same reference numerals will be used throughout the drawings to refer to the same or like parts. Embodiments of methods for making molds for shaping glass, as well as embodiments of molds for shaping glass, will be described in more detail herein with specific reference to the appended drawings.

The following description is provided as an enabling teaching. To this end, those skilled in the relevant art will recognize and appreciate that many changes can be made to the various embodiments described herein, while still obtaining the beneficial results. It will also be apparent that some of the desired benefits can be obtained by selecting some of the features without utilizing other features. Accordingly, those who work in the art will recognize that many modifications and adaptations to the present embodiments are possible and can even be desirable in certain circumstances and are a part of the present description. Thus, the following description is provided as illustrative and should not be construed as limiting.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the meanings detailed herein.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise As used herein, the term "substrate" describes a glass sheet that may be formed into a three-dimensional structure.

Generally, a mold for shaping glass can be made by a process that comprises providing a mold body having a shaping surface and modifying the composition of the shaping surface by forming a nickel oxide layer on the shaping surface. The modification of the composition of the shaping surface may be by exposure of the shaping surface to an oxidizing heat treatment. The oxidizing heat treatment may generally comprise a ramping heat treatment, a fixed heat treatment, or both, where the ramping heat treatment may comprise increasing the heating temperature at a given temperature rate and the a fixed heat treatment may comprise holding the heating temperature at a given temperature for a specified holding time. In some embodiments, the oxidizing heat treatment may not comprise the ramping heat treatment, and in some other embodiments, the oxidizing heat treatment may not comprise the fixed heat treatment. The heating may generally be performed in air, or any other oxygen containing environment.

Embodiments herein comprise nickel metal-based molds that are useful in the formation of glass substrates, such as three-dimensional glass substrates. The glass substrates may be useful as front and/or back covers for electronics devices, such as telephones, electronic tablets, televisions etc. In these electronics applications, the shape and the surface quality of the glass substrate may need to be within very tight tolerances in order to provide not only aesthetic appeal, but also to minimize weaknesses in glass surface, potential electronics issues, and minimize costs.

Referring to FIG. 1, one embodiment of a mold 100 comprising a nickel oxide layer 110 for glass-shaping is depicted. In one embodiment, a mold 100 may comprise a mold body 120 that may include a shaping surface 122 disposed on the mold body 120. The nickel oxide layer 110 may be positioned on at least a portion of the shaping surface 122 of the mold body 120. In the embodiment shown in FIG. 1, the geometry of the shaping surface 122 defines a cavity in the mold body 120. However, in other embodiments, the geometry of the shaping surface 122 may define other shapes such as protruded areas of the mold body 120 that may make contact with the glass being formed. It should be understood that a wide variety geometries of the mold body 120 may be used to form varying three dimensional glass articles. In some embodiments, more than one mold body 120 may be utilized to form a glass article. For example, two mold bodies 120 may make contact with opposite sides of a glass body to shape the glass body. Accordingly, in a two-mold embodiment, each mold body 120 may comprise a shaping surface 122 which makes contact with the glass and is coated with a nickel oxide layer 110, respectively.

The mold 100, prior to the oxidizing heat treatment, may comprise a shaping surface 122 comprising greater than about 90% nickel. The mold 100 may be made of a bulk material of greater than about 90% nickel, or may comprise a layer of at least about 90% nickel on another bulk material. The mold 100 may have high purities of nickel, such as commercially-pure nickel, for formation of three-dimensional glass substrates. High purity and ultra-high purity nickel metals, as described below, may have excellent high temperature oxidation and corrosion resistances, as well as excellent non-sticking characteristics when contacted by the softened glass. High purity and ultra-high purity nickels may be relatively soft, and therefore have been thought to not be strong enough for conventional glass forming operations. However, because the embodied processes do not apply heavy force on the mold 100, they allow for use of these materials in novel ways.

In one embodiment, the shaping surface 122 may comprise high purity nickel. The high purity nickel mold 100 makes it possible to form optical-quality glass articles. As used herein, a high purity nickel molds comprise molds 100 with a composition comprising at least 90%, 93%, 95%, 97%, 98%, 99%, 99.5%, 99.9%, 99.95%, or 99.99% nickel. In some embodiments, the shaping surface 122 may comprise about 95% to about 99.99% nickel, about 97% to about 99.99% nickel, about 98% to about 99.99% nickel, about 99% to about 99.99% nickel, about 99.5% to about 99.99% nickel, about 99.9% to about 99.99% nickel, about 95% to about 99.95% nickel, about 97% to about 99.95% nickel, about 98% to about 99.95% nickel, about 99% to about 99.95% nickel, about 99.5% to about 99.95% nickel, about 99.9% to about 99.95% nickel, about 99.9% to about 99.95% nickel, about 95% to about 99.9% nickel, about 97% to about 99.9% nickel, about 98% to about 99.9% nickel, about 99% to about 99.9% nickel, about 99.5% to about 99.9% nickel, about 95% to about 99.5% nickel, about 97% to about 99.5% nickel, about 98% to about 99.5% nickel, about 99% to about 99.5% nickel, about 95% to about 99% nickel, about 97% to about 99% nickel, about 98% to about 99% nickel, about 95% to about 98% nickel, about 97% to about 98% nickel, or about 95% to about 97% nickel.

In some embodiments, the shaping surface 122 may comprise ultra high purity nickel. As used herein, ultra high purity nickel comprises at least 99%, 99.5%, 99.9%, 99.95%, or 99.99% nickel. In some embodiments, ultra high purity nickel comprises from about 99% to about 99.99% nickel, about 99.5% to about 99.99% nickel, about 99.9% to about 99.99% nickel, about 99% to about 99.95% nickel, about 99.5% to about 99.95% nickel, about 99.9% to about 99.95% nickel, about 99.9% to about 99.95% nickel, about 99% to about 99.9% nickel, about 99.5% to about 99.9% nickel, or about 99% to about 99.5% nickel.

Examples of nickel compositions that may be used herein include, but are not limited to, commercially pure nickel grades 200 (99.6% Ni, 0.04% C), 201 (99.6% Ni, 0.02% C maximum), 205 (99.6% Ni, 0.04% C, 0.04% Mg), 212 (97.0% Ni), 222 (99.0% Ni), 233 (99% Ni), and 270 (99.97% Ni) (See. e.g., Special-Purpose Nickel Alloys, in ASM SPECIALTY HANDBOOK: NICKEL, COBALT AND THEIR ALLOYS, #06178G (ASM International 2000), herein incorporated by reference in its entirety).

The composition of the shaping surface 122 of the mold 100 may be modified by exposing the shaping surface 122 to an oxidizing heat treatment. The oxidizing heat treatment may comprises exposing the mold 100 to elevated temperatures sufficient to convert at least a portion of the nickel at the shaping surface 122 of the mold 100 into nickel oxide. The nickel oxide may comprise a layer over substantially the entire shaping surface 122 of the mold 100.

The oxidizing heat treatment may comprise a ramping heat treatment, a fixed heat treatment, or both. For example, the oxidizing heat treatment may comprise ramping the heating temperature to a given temperature and then holding at approximately that temperature. A ramping heat treatment may comprise increasing the heating temperature at a given temperature rate to a target temperature. As used herein, a heating temperature is the temperature to which the mold 100 is exposed during the oxidizing heat treatment. The rate need not be completely steady (linear function heating curve), but may be substantially completely steady, or within an established range of heating rates. A fixed heat treatment may comprise holding the heating temperature at a given temperature for a specified holding time. The specified temperature of the fixed heat treatment need not be completely constant over the entire course of the holding time, but should be within about 25° C. of the specified fixed temperature. For example, if a fixed heat treatment comprises holding the temperature at about 800° C., the actual temperature over time may vary between about 775° C. and about 825° C.

In some embodiments, a ramping heat treatment may comprise increasing a heating temperature at a rate of about 20° C./hour, about 30° C./hour, about 40° C./hour, about 50° C./hour, about 60° C./hour, about 70° C./hour, about 80° C./hour, about 90° C./hour, about 100° C./hour, 110° C./hour, about 120° C./hour, about 130° C./hour, 140° C./hour, about 150° C./hour, about 200° C./hour, about 300° C./hour, about 400° C./hour, or about 500° C./hour to a target temperature. For example, a ramping heat treatment may comprise increasing the heating temperature at a rate of from about 20° C./hour to about 500° C./hour, from about 30° C./hour to about 300° C./hour, from about 40° C./hour to about 200° C./hour, from about 50° C./hour to about 150° C./hour, from about 60° C./hour to about 140° C./hour, from about 70° C./hour to about 130° C./hour, from about 80° C./hour to about 120° C./hour, or from about 90° C./hour to about 110° C./hour. The target temperature may be from about 700° C. to about 1000° C., such as from about 800° C. to about 1000° C., from about 900° C. to about 1000° C., from about 700° C. to about 900° C., from about 800° C. to about 900° C., or from about 700° C. to about 800° C.

In some embodiments, the fixed heat treatment may comprise holding the heating temperature to at least about 300° C., 400° C., 500° C., 600° C., 700° C., 800° C., 900° C., or 1000° C. for a holding time. In some embodiments, the fixed heat treatment may comprise holding the heating temperature at a temperature of at least about from about 300° C. to about 1000° C., from about 400° C. to about 1000° C., from about 500° C. to about 1000° C., from about 600° C. to about 1000° C., from about 700° C. to about 1000° C., from about 800° C. to about 1000° C., from about 900° C. to about 1000° C., from about 300° C. to about 900° C., from about 400° C. to about 900° C., from about 500° C. to about 900° C., from about 600° C. to about 900° C., from about 700° C. to about 900° C., from about 800° C. to about 900° C., from about 300° C. to about 800° C., from about 400° C. to about 800° C., from about 500° C. to about 800° C., from about 600° C. to about 800° C., from about 700° C. to about 800° C., from about 300° C. to about 700° C., from about 400° C. to about 700° C., from about 500° C. to about 700° C., from about 600° C. to about 700° C., from about 300° C. to about 600° C., from about 400° C. to about 600° C., from about 500° C. to about 600° C., from about 300° C. to about 500° C., from about 400° C. to about 500° C., or from about 300° C. to about 400° C. The holding time may be at least about 5 minutes. For example, the holding time may be from about 15 minutes to about 1 week. For example, the holding time may be at least about 15 min, 30 min, 45 min, 1 hour, 1.5 hours, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 18 hours, 20 hours, 22 hours, or 24 hours. In some embodiments, the holding time may be from about 15 minutes to about 4 hours, from about 30 minutes to about 1.5 hours, from about 8 hours to about 24 hours, from about 12 hours to about 20 hours, from about 14 hours to about 18, or from about 15 hours to about 17 hours.

Following the ramping heat treatment or fixed heat treatment, whichever is later, the mold's surrounding temperature may be returned to at or near ambient conditions (about room temperature). The ramping heat treatment may begin at or near ambient conditions.

In some embodiment, the oxidizing heat treatment comprises both a ramping heat treatment and a fixed heat treatment. For example, the ramping heat treatment may comprise increasing the heating temperature at a rate from about 50° C./hour to about 150° C./hour to a temperature from about 700° C. to about 900° C., and the fixed heat treatment may comprise holding the heating temperature from about 700° C. to about 900° C. for a holding time from about 14 hours to about 18 hours. In other embodiments, the ramping heat treatment may comprise increasing the heating temperature at a rate from about 70° C./hour to about 130° C./hour, from about 80° C./hour to about 120° C./hour, from about 90° C./hour to about 110° C./hour, or about 100° C./hour to a temperature from about 750° C. to about 850° C., from about 750° C. to about 825° C., from about 790° C. to about 810° C., or about 800° C. and the fixed heat treatment may comprise holding the heating temperature from about 750° C. to about 850° C., from about 750° C. to about 825° C., from about 790° C. to about 810° C., or about 800° C. for a holding time from about 10 hours to about 22 hours, 14 hours to about 18 hours, 15 hours to about 17 hours, or about 16 hours.

In another embodiment, the ramping heat treatment may comprise increasing the heating temperature at a rate from about 50° C./hour to about 150° C./hour to a temperature from about 800° C. to about 1000° C., and the fixed heat treatment may comprise holding the heating temperature from about 800° C. to about 1000° C. for a holding time from about 30 minutes to about 1.5 hours. For example, the ramping heat treatment may comprise the ramping heat treatment may comprise increasing the heating temperature at a rate from about 70° C./hour to about 130° C./hour, from about 80° C./hour to about 120° C./hour, from about 90° C./hour to about 110° C./hour, or about 100° C./hour to a temperature from about 850° C. to about 950° C., from about 875° C. to about 925° C., from about 890° C. to about 910° C., or about 900° C., and the fixed heat treatment may comprise holding the heating temperature from about 850° C. to about 950° C., from about 875° C. to about 925° C., from about 890° C. to about 910° C., or about 900° C. for a holding time from about 5 minutes to 4 hours, from about 15 minutes to about 2 hours, from about 30 minutes to about 1.5 hours, from about 45 minutes to about 1.25 hours, or about 1 hour.

In another embodiment, the oxidizing heat treatment may comprise only a ramping heat treatment without a substantial fixed heat treatment, or a fixed heat treatment of less than about 15 minutes. For example, the ramping heat treatment may comprise increasing the heating temperature at a rate from about 50° C./hour to about 150° C./hour to a temperature from about 950° C. to about 1000° C., and the fixed heat treatment comprises holding the heating temperature from about 950° C. to about 1000° C. for a holding time from 0 seconds to about 30 minutes. In other embodiments, the ramping heat treatment may comprise increasing the heating temperature at a rate from about 70° C./hour to about 130° C./hour, from about 80° C./hour to about 120° C./hour, from about 90° C./hour to about 110° C./hour, or about 100° C./hour to a temperature from about 900° C. to about 1050° C., from about 950° C. to about 1000° C., from about 950° C. to at about 970° C., or about 960° C. and the fixed heat treatment comprises holding the heating temperature from about 900° C. to about 1050° C., from about 950° C. to about 1000° C., from about 950° C. to about 970° C., or at about 960° C. for a holding time from 0 seconds to about 30 minutes, such as less than about 1 hour, less than about 45 minutes, less than about 30 minutes, less than about 15 minutes, less than about 10 minutes, or less than about 5 minutes.

In another embodiment, the oxidizing heat treatment may comprise a fixed heat treatment at the maximum temperature of a ramping heat treatment for less than about 1 hour, less than about 45 minutes, less than about 30 minutes, less than about 15 minutes, less than about 10 minutes, or less than about 5 minutes.

The nickel oxide layer 110 on the mold 100 may have an average thickness of from about 500 nm to about 20 micron, about 1 micron to about 14 micron, about 1 micron to about 10 micron, or about 1.5 micron to about 2.5 micron. In some embodiments, the nickel oxide layer 110 on the mold 100 may have an average thickness of about 100 nm, about 200 nm, about 300 nm, about 400 nm, about 500 nm, about 750 nm, about 1 micron, about 2 micron, about 3 micron, about 4 micron, about 5 micron, about 6 micron, about 7 micron, about 8 micron, about 9 micron, about 10 micron, about 12 micron, about 15 micron, about 18 micron, or about 20 micron.

The glass articles formed using the molds 100 with nickel oxide layers 110 described herein may have a reduced number of defects. Ideally, the as formed quality of the part would be as good as the glass sheet from which it is formed. For the most economical process, one desires that this surface quality is achieved without further rework or polishing of the as formed surface. Defects, as used herein, include, but are not limited to, dimples (depressions in the glass surface), surface checks/cracks, blisters, chips, cords, dice, observable crystals, laps, seeds, stones, orange peel defects (pits in the formed glass from raised areas on the mold surface, for example 0.1 micron in height with a diameter greater than 30 micron), and stria. In some embodiments, there are less than an average of 50, 40, 30, 20, 10, 5, 4, 3, 2, or 1 defects that are observable by the unaided human eye at 1000 lux in a 25 mm×25 mm area on any of the surfaces. In some embodiments, there are less than an average of 50, 40, 30, 20, 10, 5, 4, 3, 2, or 1 defects that are 150 micron in the largest dimension in a 25 mm×25 mm area on any of the surfaces, as measured by optical microscopy. In some embodiments, the defect is 1, 2, 3, 5, 10, 20, 30, 40, 50, 60, 70, 80, 90, 100, 125, or 150 micron in the largest dimension.

In another embodiment, glass articles formed using the molds 100 with nickel oxide layers 110 described herein may be essentially flawless. By "essentially flawless," it is meant that there are no indentations (or dimples) larger than 150 micron in diameter, as measured by an optical microscopy technique, in the surfaces. In some embodiments, there are less than an average of 50, 40, 30, 20, 10, 5, 4, 3, 2, or 1 indentations (or dimples) larger than 150 micron in diameter in the largest dimension in an 25 mm×25 mm area on any of the surfaces, as measured by optical microscopy. In some embodiments, the dimple size is larger than 1, 2, 3, 5, 10, 20, 30, 40, 50, 60, 70, 80, 90, 100, 125, or 150 micron in the largest dimension.

Without intending to be held to a particular theory, it is believed the decrease in the level of defects on the as formed glass surface with high purity and ultra-high purity nickel molds 100 is due to at least two causes. First, nickel and nickel oxide appear to be unreactive with the glass. In particular, aluminosilicate glasses appear to be highly unreactive. By unreactive it is intended to mean that the glass doesn't readily stick to the Ni mold material and there is no significant chemical reaction between the glass or glass volatiles that causes the build-up of material on the mold surface.

The second reason for the decreased level of defects on the as formed glass surface with high purity and ultra-high purity nickel is the reduced level of impurities and inclusions in the nickel. These impurities comprise one or more of the following: Cu, Fe, Mn, C, Si, S, Mg, Al and Ti. These impurities are typically present in the Ni based alloys as oxides, sulfides and carbides. In many if not most cases the oxides, sulfides and carbides exist in the microstructure of the Ni alloy as a distinct phase, commonly called an inclusion, that is randomly distributed throughout the alloy. A certain percentage of these inclusions will end up on the machined and polished surface of the mold. During the glass forming process, these inclusions that are at or near the mold surface can be reactive with the glass and stick to it, or oxidize and react at a rate that is different from the bulk metal and thus form a protrusion on the mold surface.

Both conditions cause a localized area on the mold surface that can stick to the glass or cause high pressure points that drag across the glass surface during the forming process and cause defects in the as formed surface. It follows that as the high purity and ultra-high purity nickel mold becomes purer, the number of inclusions in the metal decreases and the frequency of inclusions that intersect the machined mold surface decreases. Decreased inclusions on the shaping surface 122 lead to decreased occurrence of defects on the as formed glass surface.

In some embodiments, the nickel oxide layer 110 may have an average surface roughness ($R_a$) of less than or equal to about 1 micron on the shaping surface 122 of the mold 100. In some embodiments, this average surface roughness ($R_a$) is determined over an evaluation length, such as 100 µm, 10 mm, 100 mm, etc. or may be determined based on an analysis of the entire shaping surface. As used herein, $R_a$ is defined as the arithmetic average of the differences between the local surface heights and the average surface height and can be described by the following equation:

$$R_a = \frac{1}{n}\sum_{i=1}^{n}|y_i|,$$

where $y_i$ is the local surface height relative to the average surface height. In other embodiments $R_a$ may be less than or equal to about 0.75 micron, 0.5 micron, or even 0.25 micron over an evaluation length of 10 mm.

In some embodiments, the nickel oxide layer 110 may have a peak surface roughness ($R_p$) of less than or equal to about 1.5 micron on the shaping surface 122 of the mold 100. In some embodiments, this average surface roughness ($R_p$) is determined over an evaluation length, such as 100 µm, 10 mm, 100 mm, 1 cm, etc. As used herein, $R_p$ is defined as the difference between the maximum height and the average height. and can be described by the following equation:

$$R_p = \max_i y_i,$$

where $y_1$ is the maximum height relative to the average surface height. In other embodiments $R_p$ may be less than or equal to about 1.25 micron, 1 micron, 0.75 micron, 0.5 micron, or even 0.25 micron over an evaluation length of 10 mm.

Embodiments of the molds 100 described herein may be used in any forming processes, such as 3D glass forming processes. The molds 100 are especially useful in forming 3D glass articles when used in combination with the methods and devices described in U.S. application Ser. Nos. 13/480,172 and 13/709,594, herein incorporated by reference in their entireties. Processes embodied in U.S. application Ser. Nos. 13/480,172 and 13/709,594 use a mold temperature fairly close to that of the glass—meaning the mold 100 operates at a temperature in the range of 600 to 700° C. The issue of glass sticking to the mold 100 during the forming process is a well-known to increase with increased mold/metal temperature. These mold temperatures are at least 100-200° C. hotter than the typical temperature of a mold 100 used in a pressing process and the operational range in which we vacuum form is in a region where mold to glass sticking occurs and which leads to cosmetic and structural defect formation in the glass. The embodied high and ultra-high purity nickel molds provide a novel means of addressing this sticking or adhesion issue and provide glass articles with little to no surface defects or flaws.

The molds 100 described herein may be utilized in making glass articles by forming a glass article by contacting glass with the mold 100 at a temperature sufficient to allow for shaping of the glass. In some embodiments, the nickel molds 100 may be used in the following process: a typical thermal reforming process involves heating the 2D glass sheet to a forming temperature, e.g., a temperature in a temperature range corresponding to a glass viscosity of $10^7$ Poise to $10^{11}$ Poise or between an annealing point and softening point of the glass, while the 2D glass sheet is on top of a mold 100. The heated 2D glass sheet may start sagging once heated. Typically, vacuum is then applied in between the glass sheet and mold 100 to conform the glass sheet to the shaping surface 122 and thereby form the glass into a 3D glass article. After forming the 3D glass article, the 3D glass article is cooled to a temperature below the strain point of the glass, which would allow handling of the 3D glass article.

The glass articles formed via the embodiments herein may be described by U.S. Prov. Appl. No. 61/653,476. The three-dimensional (3D) glass articles can be used to cover an electronic device having a display, for example as part or all of the front, back, and or sides of the device. The 3D cover glass can protect the display while allowing viewing of and interaction with the display. If used as the front cover, the glass articles can have a front cover glass section for covering the front side of the electronic device, where the display is located, and one or more side cover glass sections for wrapping around the peripheral side of the electronic device. The front cover glass section can be made contiguous with the side cover glass section(s).

The preformed glass used to in the processes described herein typically starts as a two dimensional (2D) glass sheet. The 2D glass sheet may be made by a fusion or float process. In some embodiments, the 2D glass sheet is extracted from a pristine sheet of glass formed by a fusion process. The pristine nature of the glass may be preserved up until the glass is subjected to a strengthening process, such as an ion-exchange chemical strengthening process. Processes for forming 2D glass sheets are known in the art and high quality 2D glass sheets are described in, for example, U.S. Pat. Nos. 5,342,426, 6,502,423, 6,758,064, 7,409,839, 7,685,840, 7,770,414, and 8,210,001.

In one embodiment, the glass is made from an alkali aluminosilicate glass composition. An exemplary alkali aluminosilicate glass composition comprises from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %. This alkali aluminosilicate glass is described in U.S. Pat. No. 8,158,543.

Another exemplary alkali-aluminosilicate glass composition comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1.Al_2O_3-28.7.B_2O_3+15.6.Na_2O-61.4.K_2O+8.1.(MgO+ZnO) \geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. Provisional Patent Ion Application No. 61/503,734 by Matthew J. Dejneka et al., entitled "Ion Exchangeable Glass with High Compressive Stress," filed Jul. 1, 2011, the contents of which are incorporated herein by reference in their entirety.

Other types of glass compositions besides those mentioned above and besides alkali-aluminosilicate glass composition may be used for the 3D cover glass. For example, alkali-aluminoborosilicate glass compositions may be used for the 3D cover glass. Preferably, the glass compositions used are ion-exchangeable glass compositions, which are generally glass compositions containing small alkali or alkaline-earth metals ions that can be exchanged for large alkali or alkaline-earth metal ions. Additional examples of ion-exchangeable glass compositions may be found in U.S. Pat. Nos. 7,666,511, 4,483,700, and U.S. Pat. No. 5,674,790 and U.S. patent application Ser. No. 12/277,573 (Dejneka et al.; 25 Nov. 2008), Ser. No. 12/392,577 (Gomez et al.; 25 Feb. 2009), Ser. No. 12/856,840 (Dejneka et al.; 10 Aug. 2010), Ser. No. 12/858,490 (Barefoot et al.; 18 Aug. 18, 2010), and Ser. No. 13/305,271 (Bookbinder et al.; 28 Nov. 2010).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

It should now be understood that the molds disclosed herein may offer the advantage of reduced flaws on the surface of glass which is shaped by the herein disclosed molds. It should now also be understood that molds with superior surface characteristics may be produced by the methods described herein, particularly by utilizing the heating regimes disclosed herein to produce oxide layers on the shaping surfaces of the molds.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Various modifications and variations can be made to the embodiments described herein without departing from the scope of the claimed subject matter. Thus it is intended that the specification cover the modifications and variations of the various embodiments described herein provided such modification and variations come within the scope of the appended claims and their equivalents.

Example

Figure 2:
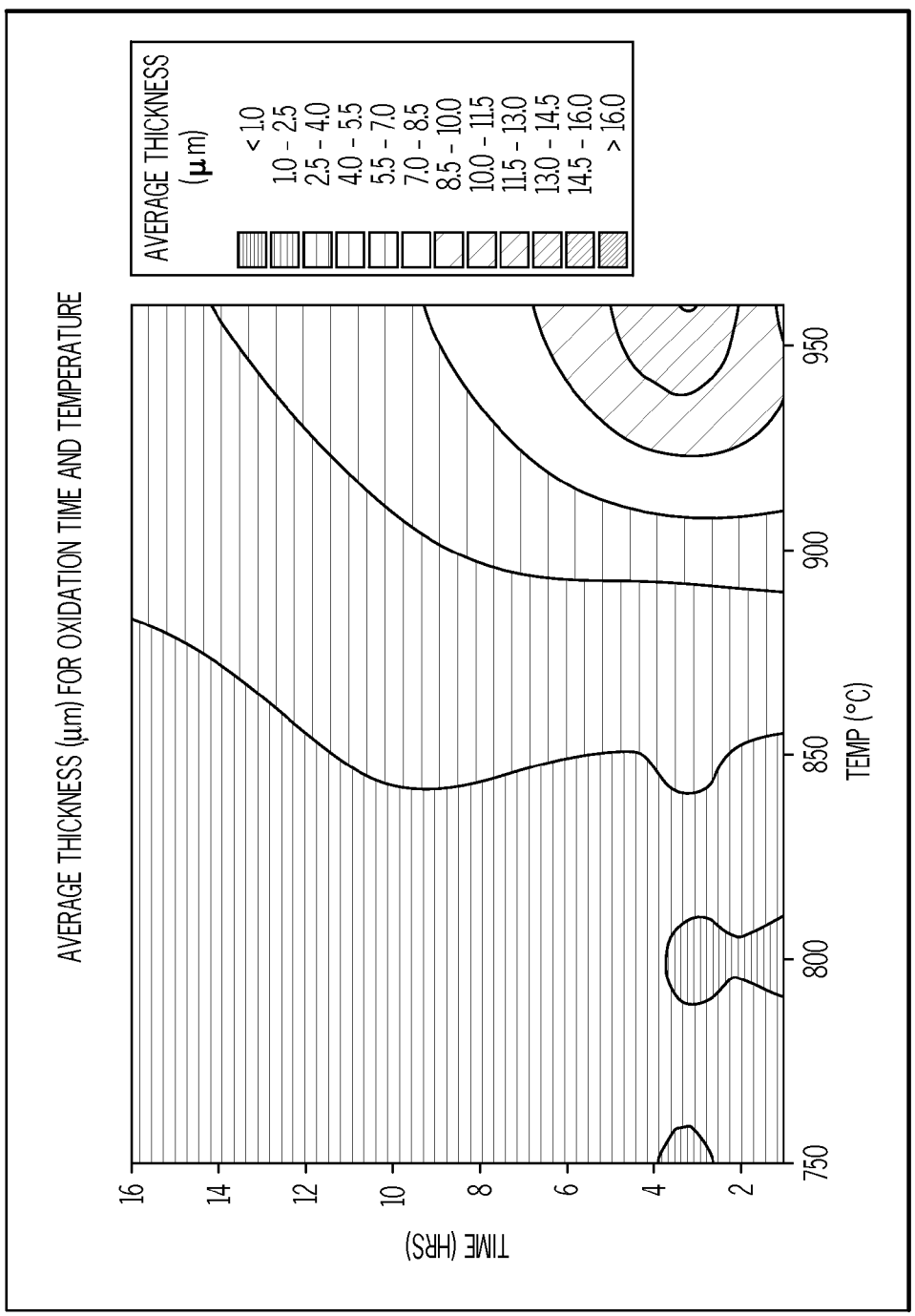
FIG. 2 graphically depicts the average thickness of nickel oxide layers formed by varied fixed temperatures and holding times.
Figure 3:
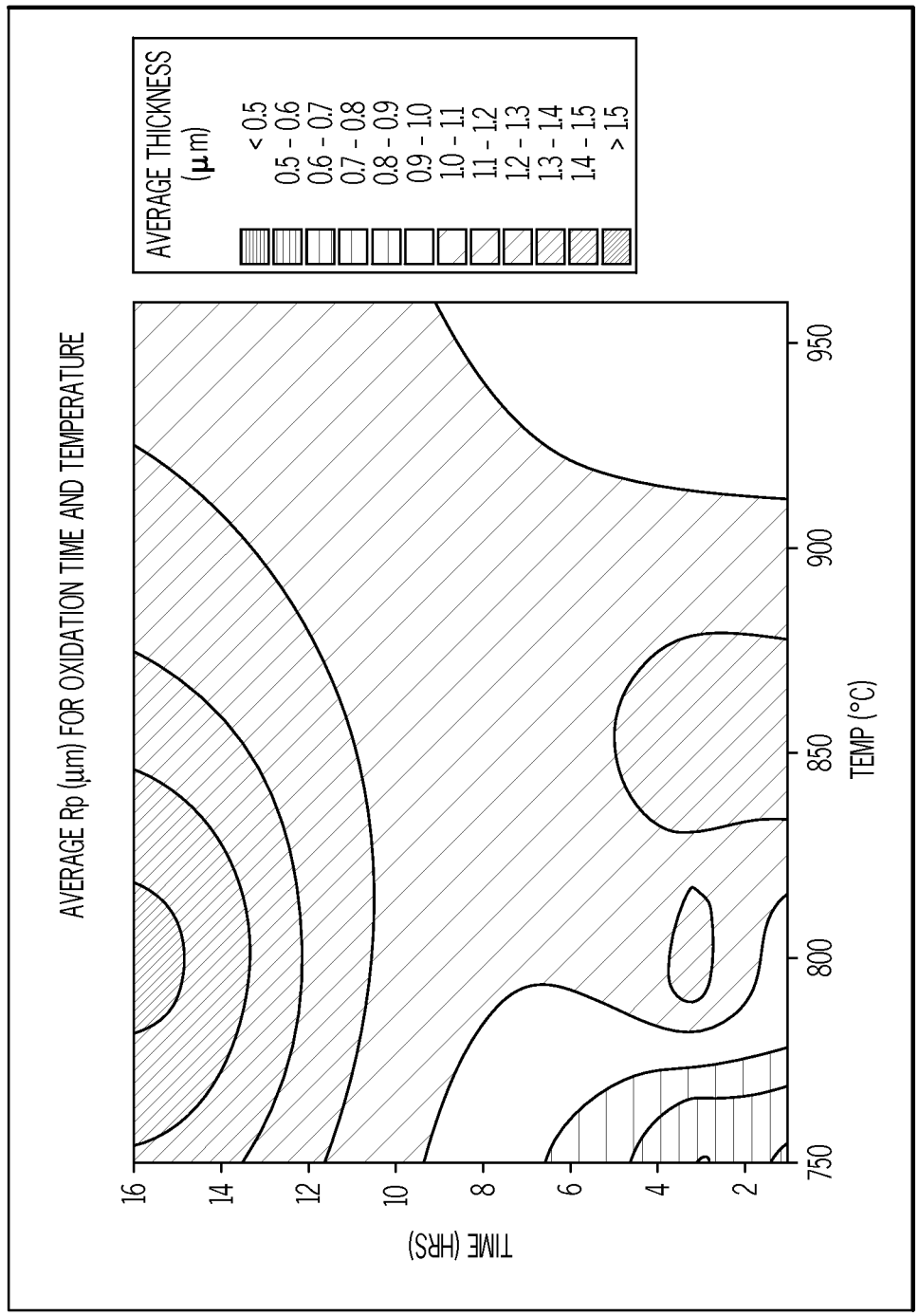
FIG. 3 graphically depicts the peak surface roughness of nickel oxide layers formed by varied fixed temperatures and holding times.

Molds were prepared by exposing preformed high purity nickel molds to oxidizing heat treatments of ramping the heating temperature from room temperature at 100° C./hr to a fixed heating temperature and holding for a given time period. FIG. 2 shows average thickness of the nickel oxide layers formed and FIG. 3 shows the peak surface roughness based on holding times and temperatures for the fixed heat treatment. The nickel mold contained at least 99% nickel, sometimes referred to as "201 nickel". The heating was performed in air.

We claim:

1. A mold for shaping glass, the mold comprising:
   a mold body having a shaping surface, wherein at least a portion of the mold body near the shaping surface comprises at least about 90% nickel; and
   a nickel oxide layer on the shaping surface, wherein the nickel oxide layer has an average thickness from about 500 nm to about 30 micron, and wherein the nickel oxide layer has an average surface roughness ($R_a$) of less than or equal to about 1 micron on the shaping surface of the mold.

2. The mold of claim 1, wherein the nickel oxide layer has an average thickness from about 1 micron to about 20 micron.

3. The mold of claim 1, wherein the nickel oxide layer has a peak surface roughness ($R_p$) of less than or equal to about 1.5 micron on the shaping surface of the mold.

4. A method for making a glass article, the method comprising:
   supplying a mold for shaping glass, the mold comprising:
   a mold body having a shaping surface, wherein at least a portion of the mold body near the shaping surface comprises at least about 90% nickel; and
   a nickel oxide layer on the shaping surface, wherein the nickel oxide layer has an average thickness from about 500 nm to about 30 micron, and wherein the nickel oxide layer has an average surface roughness ($R_a$) of less than or equal to about 1 micron on the shaping surface of the mold; and forming a glass article by contacting glass with the mold at a temperature sufficient to allow for shaping of the glass.

5. The method of claim 4, wherein the nickel oxide layer has an average thickness from about 1 micron to about 20 micron.

* * * * *